(12) United States Patent
Pratt

(10) Patent No.: US 10,204,361 B2
(45) Date of Patent: Feb. 12, 2019

(54) METHOD AND SYSTEM FOR GAMIFIED CROWDFUNDING

(71) Applicant: Givling, Inc., Jackson, WY (US)

(72) Inventor: Lizbeth Lenore Pratt, Jonesport, ME (US)

(73) Assignee: Givling, Inc., Jackson, WY (US)

( * ) Notice: Subject to any disclaimer, the term of this patent is extended or adjusted under 35 U.S.C. 154(b) by 500 days.

(21) Appl. No.: 14/785,322

(22) PCT Filed: Oct. 16, 2015

(86) PCT No.: PCT/US2015/055962
§ 371 (c)(1),
(2) Date: Oct. 17, 2015

(87) PCT Pub. No.: WO2016/061469
PCT Pub. Date: Apr. 21, 2016

(65) Prior Publication Data
US 2016/0110776 A1    Apr. 21, 2016

Related U.S. Application Data

(60) Provisional application No. 62/065,587, filed on Oct. 17, 2014, provisional application No. 62/109,014, (Continued)

(51) Int. Cl.
*G06Q 30/02* (2012.01)
*G07F 17/32* (2006.01)
(Continued)

(52) U.S. Cl.
CPC ..... *G06Q 30/0279* (2013.01); *G07F 17/3223* (2013.01); *G07F 17/3239* (2013.01);
(Continued)

(58) Field of Classification Search
CPC .. G06Q 10/101; G06Q 20/10; G06Q 30/0279; G06Q 40/025
See application file for complete search history.

(56) References Cited

U.S. PATENT DOCUMENTS 6,293,865 B1    9/2001   Kelly et al.
6,317,741 B1    11/2001  Burrows
(Continued)

OTHER PUBLICATIONS

"3 websites that help you raise funds for college" by Jon Fortenbury, published May 16, 2013. Source http://college.usatoday.com/2013/05/16/3-websites-that-help-you-raise-funds-for-college/.*
(Continued)

*Primary Examiner* — Steven J Hylinski
(74) *Attorney, Agent, or Firm* — Sarah J. Rhoades

(57) ABSTRACT

A system and method for gamified crowdfunding over the Internet in order to crowdfund worthy or charitable causes while offering incentives and rewards in the form of an entertaining game and the potential added benefit of a share of the proceeds. Proceeds from the gamified crowdfunding could be shared between the worthy cause and the high scoring donor-participants. A host identifies and selects, through a contest or other selection process, a cause or beneficiary to be featured. The host possesses or owns a server with a processor and memory in which to store a game of knowledge or skill and the game interface and that server is accessed by users via a network. Through the game, queries and answers are exchanged. Through a personal computing device, a user creates an account, pays funds to support a cause, and competes and interacts with the game and other users.

20 Claims, 11 Drawing Sheets

Related U.S. Application Data filed on Jan. 28, 2015, provisional application No. 62/160,397, filed on May 12, 2015.

(51) Int. Cl.
 *G06Q 40/02* (2012.01)
 *G06Q 10/10* (2012.01)
 *G06Q 20/10* (2012.01)

(52) U.S. Cl.
 CPC ...... *G07F 17/3258* (2013.01); *G07F 17/3272* (2013.01); *G06Q 10/101* (2013.01); *G06Q 20/10* (2013.01); *G06Q 40/025* (2013.01)

(56) References Cited

U.S. PATENT DOCUMENTS

| | | | |
|---|---|---|---|
| 6,425,828 | B2 | 7/2002 | Walker et al. |
| 6,468,159 | B1 | 10/2002 | La Mura et al. |
| 6,565,442 | B2 | 5/2003 | La Mura et al. |
| 6,647,384 | B2 | 11/2003 | Gilmour |
| 6,676,521 | B1 | 1/2004 | La Mura et al. |
| 7,762,557 | B2 | 7/2010 | Davidzon et al. |
| 8,160,922 | B2 | 4/2012 | Postrel |
| 8,554,571 | B1 | 10/2013 | Harrison, Jr. |
| 8,684,807 | B1 | 4/2014 | Crici |
| 8,768,828 | B2 | 7/2014 | Olliphant et al. |
| 8,793,171 | B2 | 7/2014 | Hollas |
| 8,821,258 | B2 | 9/2014 | Kelly et al. |
| 2002/0111815 | A1* | 8/2002 | Smith ............... G06Q 30/0279 705/31 |
| 2002/0155886 | A1* | 10/2002 | Kidron ............... G06Q 50/34 463/25 |
| 2003/0032476 | A1* | 2/2003 | Walker ............... G06Q 20/00 463/25 |
| 2004/0248652 | A1 | 12/2004 | Massey et al. |
| 2005/0090307 | A1 | 4/2005 | Walker et al. |
| 2005/0228742 | A1* | 10/2005 | McHale ............... G06Q 40/04 705/37 |
| 2008/0146340 | A1 | 6/2008 | Ami |
| 2008/0147542 | A1 | 6/2008 | Dunlop et al. |
| 2008/0207311 | A1 | 8/2008 | Levinas et al. |
| 2008/0242423 | A1 | 10/2008 | Kerr et al. |
| 2009/0037311 | A1 | 2/2009 | Omar |
| 2009/0192873 | A1 | 7/2009 | Marble |
| 2010/0161465 | A1 | 6/2010 | McMaster |
| 2012/0078762 | A1 | 3/2012 | Valin et al. |
| 2013/0059639 | A1* | 3/2013 | Farah ............... G07F 17/3244 463/17 |
| 2013/0116044 | A1 | 5/2013 | Schwartz |
| 2013/0226688 | A1 | 8/2013 | Harvilicz et al. |
| 2014/0012780 | A1 | 1/2014 | Sanders |
| 2014/0022594 | A1 | 1/2014 | Diaz |
| 2014/0025473 | A1 | 1/2014 | Cohen |
| 2014/0040157 | A1 | 2/2014 | Cohen et al. |
| 2014/0052519 | A1 | 2/2014 | Sanders |
| 2014/0067644 | A1 | 3/2014 | Cameron et al. |
| 2014/0164291 | A1 | 6/2014 | Cameron et al. |
| 2014/0236750 | A1 | 8/2014 | Zhou et al. |
| 2014/0279645 | A1 | 9/2014 | Cohen et al. |
| 2014/0279682 | A1 | 9/2014 | Feldman |
| 2014/0310154 | A1 | 10/2014 | Fish et al. |
| 2015/0242951 | A1* | 8/2015 | Pillai ............... G06Q 40/06 705/36 R |

OTHER PUBLICATIONS

"Crowdfunding for Student Loan Debt?" by Christine DiGangl, published Sep. 11, 2013. Source http://blog.credit.com/2013/09/crowdfunding-for-student-loan-debt/.*

* cited by examiner

METHOD AND SYSTEM FOR GAMIFIED CROWDFUNDING

CROSS-REFERENCE TO RELATED APPLICATIONS

This patent application claims priority under the Article 4 of the Paris Convention and under 35 U.S.C. § 119(e) to the following pending U.S. Patent Applications: (1) U.S. Patent Application No. 62/065,587 entitled "Method and System for Combining a Game of Skill with Crowdfunding" filed on 17 Oct. 2014, (2) U.S. Patent Application No. 62/109,014 entitled "Method and System for Combining a Game of Skill with Aggregated Crowdfunding" filed on 28 Jan. 2015, and (3) U.S. Patent Application No. 62/160,397 entitled "Method and System for Gamified Crowdfunding" filed on 12 May 2015. The entire disclosures of these patent applications are hereby incorporated by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

Field of the Invention

This invention relates to gamification of crowdfunding to increase user participation and contributions, crowdfunding which uses a competitive game of knowledge to dual fund a designated cause and the high-scoring participants, and more particularly to such a game which may be played by many participating funders at once through a network of computers and mobile devices such that they fund an aggregated set of loans.

Description of the Related Art

Through the Internet, a massive number of individuals interact virtually to form an online community communicating via a network. Entrepreneurs and groups have found ways to create or solicit these online communities which enables them to reach out to the many individuals to create unique opportunities to share knowledge, collaborate or even raise capital. Through use of the network, the online community may take initiative to support goals or causes which may be of common interest. Some exploits have allowed the network of connected individuals to realize grand accomplishments.

Crowdsourcing is one way individuals use the connections through the network to obtain services, products, or ideas by soliciting contributions from a large group of people. Online venture capital campaigns have improved the economy by raising money through a type of crowdsourcing called crowdfunding.

Meanwhile, the Internet and online social networks have been exploited by gaming companies for the capital gain of those companies. Participants in the online gaming communities pay large sums of money to be a part of the game. Online affiliates pay money to gaming companies in the form of advertising and other compensation.

Social connections within the online community are furthered by the use of social networks. Exploitation of these networks by crowdsourcing sites and gaming sites allows extra expansion of these programs and services.

It is ingrained in humans to seek knowledge. It is also innate that humans will seek to compete with other humans. Naturally, then, there has been a long history of trivia competitions where participants compare smarts. Online hosts have provided various incarnations of trivia competitions, some complimentary competitions, some requiring membership, and some for a fee. These trivia competitions typically incorporate a social network interface so that participants can interact with their existing communities or build more connections with individuals having like interests.

BRIEF SUMMARY OF THE INVENTION

In simplified summary, the present invention provides a new, nonobvious combination of fee-based games provided to entertain users, with competitive trivia tournaments, and with online crowdfunding whereby fundraising campaigns seek to accomplish a larger monetary goal by asking for nominal, per user contributions from the masses. An exemplary embodiment of the present invention provides a method and system for combining a game of skill with crowdfunding for a cause over a network where the profits of the game are shared between the cause and the participants after administration fees are deducted from the gross contributions. The system comprises a host, a cause, a user, at least one user device, a host computer (server) with a processor and memory containing programming instructions, a game of knowledge or skill stored on the computer, a user-to-host interface, an account to hold and distribute funds, and a network to communicate game interactions and funds transfers. A method of using the system will require users (funders) to pay-to-play the game of skill with nominal contributions paid for each right to participate. Another method of using the system will allow donors to a cause to have access to a competition. Another method of using the system will provide a free game to support a cause with a suggested donation for participation. Another method of using the system will occur when the host is a not-for-profit organization which can receive donations and in exchange can host a game for entertainment.

Prior uses of the available technologies have failed to utilize the online Internet community to crowdfund worthy causes while offering incentives and rewards in the form of an entertaining game of skill with potential added benefit of a share of the proceeds because a share is distributed to the high scoring donor-participants, or funders.

In the present invention, the host identifies and selects, through a contest or other selection process, a cause or beneficiary for the crowdfunding campaign. The host may make marketing efforts to champion the cause or campaign. For discussion, one exemplary embodiment provides the cause as being individuals with debt, particularly student loan debt and ideally an aggregated set of student loan debtors. The host possesses or owns a server with a processor and memory in which to store a game of knowledge or skill and the game interface. For discussion, in one exemplary embodiment, the game of skill will be a trivia game. In this embodiment, workers research, build, develop, update and maintain a database of queries and statements along with the correct answers and responses. A user or funder, motivated by a desire to support the cause or a desire to be entertained by the game, or both, accesses the game through a user device. A user-to-host interface permits users or funders to create an account, pay funds to support a cause, and interact with the game provided by the host. In one embodiment, the interface is presented as an application (app) for use with a user device such as a mobile phone, tablet, or computer. The account set up and funds transfers will be conducted according to industry standards.

In the exemplary embodiment of a trivia contest, more than one user is required. Ideally, a plurality of users will participate. The users may be randomly assigned to teams with other users in order to compete with other teams. In addition to competing with other teams, users will compete with other members of their team to earn standing and additional rewards or prize money, or a larger percentage of any funds earned by the team. In the preferred embodiment, a user will be permitted to participate in up to three rounds. Only one round will be through active interaction with the game interface. If assigned to additional rounds, the user's participation will be as a passive teammate to another user. If assigned to other teams, the passive teammates contribute their score, earned in their active rounds, to a later, active teammate. The active teammate can view his or her standing relative to any passive teammates assigned. This feedback may provide additional motivation or incentive to the active user. A user may gain bonus points for providing correct responses more quickly than any assigned teammate or by surpassing the scores of any teammates during an active round.

In the preferred embodiment, the host or game originator may deduct or charge a fee for servicing and administering the crowdfunding game. The host may be a for-profit company seeking to provide a superior game experience. In other instances, the host may be a non-profit organization seeking direct support or funding from the crowd of online funders.

The host, through individuals and groups of workers must constantly replenished questions, queries, or statements. In the preferred embodiment, the host will add approximately 200 new true or false statements each day. The host must also fact check the questions, queries, or statements prepared by these individuals with either man power or automated processing units. The randomized assignment of users to teams, when applicable, will be by electronic processor.

In one embodiment, the following terminology applies:

Account: a user's information which is tied to a profile used to keep track of the user's score and available funds.

Answer: true or false response to a statement.

Bonus Board: demonstration of extra points earned by a player for surpassing teammate's scores if assigned or earned by responding in less time.

Daily Award: portion of funds collected in a 24 hour period of a Funding Period which portion of funds is awarded to the Funding Team earning the highest Team Score for that 24 hour period.

Debtor: the student loan debtor whose loan will be associated with a set of other student loans and assigned an aggregated Reference Number.

End: termination of Funding Period when the total goal fund associated with the aggregated student loan set and assigned a particular Reference Number has been raised by the crowd, meaning the accumulation of a fund of approximately 220% of the featured loan set's aggregated amount.

Free Play: an instance of user participation that does not require payment, but which may be limited to one per day per player.

Fund: the total amount of monies accumulated during a Funding Period less processing, administration, or servicing, and convenience charges and divided between the student debtors' loan holders (banks), student debtors' tax authorities (government), and the funding team with the highest cumulative score as well as funding teams with high scores for Daily Award periods.

Funder: a user, or player or participant of the exemplary crowdfunding game embodiment who is providing Answers and responses to questions, queries, or Statements.

Funding Period: the period of the crowdfunding game during which a set of student loans associate with a Reference Number are featured for funding.

Funding Team: one or more funders, including one who may initiate the team creation, and if one or more other funders are added, they are randomly generated and paired with the initiating member.

Game Round: a funder-initiated play where the Funder or user is given up to about 200 Statements in a 24 hour period that he or she answers "true or false." The round ends when the initiating Funder has three strikes or has seen all Statements available in a particular day.

Game Coin: a voucher or credit purchased and redeemed to play one round of the game; may be purchased in increments for as little as $0.50 each, plus a service fee; or may be purchased in single quantities for around $0.80 each or may be purchased in larger bulk buys, such as 20 for $10.30.

Givling: an exemplary, crowdfunded game set offered by a for-profit host that pays off aggregated student loans and allows highest scoring Funding Teams to earn a share of the Fund.

Holder: the financial institution holding the note on the debtor's student loan.

My Score: total points earned by a user during an active round and used, if assigned to a team, in passive rounds.

Queue: listing or line-up of student loans to be added to a set of student loans and the associated Reference Number. The Queue determines the order in which the loans will be paid off in the aggregated set.

Reference Number: the marker or number assigned to a set of aggregated, featured student loan debts and used for loan set identification purposes.

Statement: a true or false trivia declaration that needs to be answered correctly within a set time limit in order to win points.

Strike: a wrong or untimely Answer or response to a Statement or question or query.

Team Score: combined score of two or more Funders that make up the Funding Team.

Worth: the total value of the set of aggregated student loans being funded, verified with the respective Holder or Holders by the host.

In this exemplary embodiment, the crowdfunding game set uses pay-to-play, crowd participation in a series of trivia challenges to simultaneously fund a prize fund for the highest scoring benefactors and a payout fund that gives money to pay down or fully satisfy outstanding, third party student loan debts. An administrative fee is retained by the provider or host to pay for the service.

Student loan debts are verified by the host. Aggregated student loan debts are featured in a game after being assigned a number and a worth value associated with the amount of the aggregated set of loans to be satisfied. Crowd participation is encouraged on a daily basis because a portion of the daily funds raised will be paid out to the Funding Team earning the high score in that 24 hour period. For the Funding Team earning the highest score for the entire Funding Period, that team will also earn the funding split of the goal fund for the entire Funding Period. Thus, funding shares up to or equal to an aggregated student loan amount are earned and shared among the participating Funding Team with the highest Team Score per Funding Period.

The crowdfunding game offers participants an opportunity to learn or extend their knowledge. Queries will cover many topics including current or historical events. Participant Funders test their knowledge and exhibit their prowess in these subjects among and alongside other participants on their Funding Teams (when assigned) as they compete among themselves and with other teams during a single Funding Period. Combining the human drive to compete with the desire to support online community programs with nominal, individual contributions from the masses allows money to be acquired on a larger scale. New and existing networks can be utilized to encourage social movements of import. The gamified crowdfunding instills a sense of community in participants who can work together as a team to benefit one another and also benefit the student loan debtors who are the subject of the group of student loans aggregated under a Reference Number and featured in a Funding Period. All aspects of the crowdfunding game are for educational and entertainment purposes only and are not to be considered any form of gambling or wagering.

In general, there are two types of participation permitted (1) Free Play and (2) Paid Play. Free Play and Paid Play participation both require the creation of an Account. The Account will be how the host identifies the Funders. Funders will identify and interact with other Funders by use of the Funder's user profile. No guest participation is permitted.

After creating an account, a Funder is awarded one free game or play per day. In the exemplary embodiment, a Free Play must be played on the day it is granted, or it is forfeited. Free Plays do not accumulate over time, cannot be saved, cannot be shared, have no cash surrender value, and cannot be exchanged for cash or anything else. The daily Free Play score earned by a Funder is treated as a paid round score. Correct Answers returned from a Free Play will be awarded points which may be used during the current or in some future Funding Periods. Free Plays will not increase the value or amount available for payment at the end of the Funding Period. Users are allotted three Strikes during Free Play and Paid Play alike.

Paid Play permits Funder participation at a per-Game Round fee until one of the following events occurs: (1) the Funder accumulates the maximum of three Strikes per Game Round, (2) the Funder runs out of money in his account, (3) the Funder chooses to stop playing a Game Round, and after the expiration of the allotted response times will automatically be charged with three Strikes, (4) the Funding Period Ends, (5) or the Funder answers the maximum questions available. See additional detail herein.

In the exemplary embodiment, all Funding Periods will be associated with a crowdfunded pool of money to be split between student loan debtors and game participants. Approximately ten percent (10%) of all money raised in each Funding Period will be retained by the host to support and maintain game functionality. These funds may be applied in any manner or paid to third party vendors such as payment service providers like Paypal®. Approximately ninety percent (90%) of all funds paid into the game will be available in the gamified crowdfunding share Fund which will be split between (1) the student loans including interest and taxes featured under the aggregated Reference Number and (2) the Funding Team with the highest Team Score in Daily Award periods and then the Funding Period according to the gamified crowdfunding procedures herein. Regardless of the amount of the fund to be shared from the Funding Period, it will be split equally between the high scoring Funding Teams and the student loans aggregated under the Reference Number, subject to tax and interest deficits or overruns due on the loan accounts.

For example a "$5 Million Givling" means that the Funding Period will continue until $11 Million Dollars is raised by crowdfunding. Of the $11 Million goal fund, $4 Million will be earned and shared by the successful Funding Team earning the highest Team Score during a particular Funding Period, up to $1 Million over the entire Funding Period will be available for Daily Awards earned by high scoring Funding Teams in those interval periods, and $5 Million will be paid toward student loans featured in a Funding Period, including interest and loan payoff-associated taxes. Any overruns or deficits from one Funding Period will be applied toward the next Funding Period. The host may adjust the amount funded due to intervening payments, fees or interest. If not funded, fees, taxes, and interest will remain the student debtor's sole responsibility.

Student loan debtors are limited so that only one student loan shall be featured for any one individual, for life. Meanwhile, Funder participation will not be limited so long as they comply with all of the game rules and the terms and conditions set forth by the host.

All payments to the members of a high scoring Funding Team will be initiated within a reasonable time after the completion of a Funding Period or Daily Award period. A reasonable time may be 72 hours. Members of a Funding Team receiving money may incur a tax liability as a result of receiving a funding split and is responsible to report and pay his or her own taxes to the applicable authorities. Within five (5) business days of raising sufficient funds upon the completion of the Funding Period featuring a particular loan, a funds transfer of the amount raised for that loan will be initiated directly to the bank or entity holding the verified student loan. This means that in some cases, payment may be sent to student loan debt Holders before the close of a Funding Period as early as 5 business days after an amount sufficient to cover a loan is raised, in the order in which a loan was queued. In one embodiment, the host will make an effort to set up the fund goal so that necessary monies are available to cover anticipated tax consequences experienced by student loan debtors as a result of the loan payments from the fund.

Once a Funder buys credits or coins, no refunds will be provided. This will insure the integrity of the Fund. The Funder may use the credits to play out his or her rounds. Another way to look at this policy in the exemplary embodiment is to understand that once a participating crowd-funder dedicates his money to the student loan funding program he is essentially purchasing tickets, called Game Coins to support the program generally. In some cases, the Funder may select to which loan the purchase will be applied by electing into which Funding Periods he wishes to participate. Any number of factors may influence which featured loan a Funder may choose to direct his Coins. Such factors may include: familiarity with or affinity for the loan debtor, Worth of Reference Number loan, number of other Funders or participants, or amount of time available to successively complete the trivia game round.

To accomplish the foregoing and related ends, the following description and the drawings set forth in detail certain illustrative features of one or more aspects of the present invention. These features are indicative of only a few of the various ways in which the principles of the invention aspects may be employed, and this description is intended to include all such aspects and their equivalents. The features and aspects will be more fully described and particularly pointed out in the claims.

The foregoing has outlined, in general, an introduction to the selection of concepts for a crowdfunded, high-speed game of knowledge that pays off student loans and awards cash prizes to funders. This summary is to serve as an aid to better understanding the more complete detailed description which is to follow and should not be considered limiting in anyway. In reference to such, there is to be a clear understanding that the present invention is not limited to the method or detail of construction, environment, processing systems, or application of use described and illustrated herein. Any other variation of interaction, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow. Embodiments are illustrated by way of example and not limitation in the figures of the accompanying drawings, in which like references indicate similar elements and in which.

DETAILED DESCRIPTION OF THE INVENTION

Figure 1:
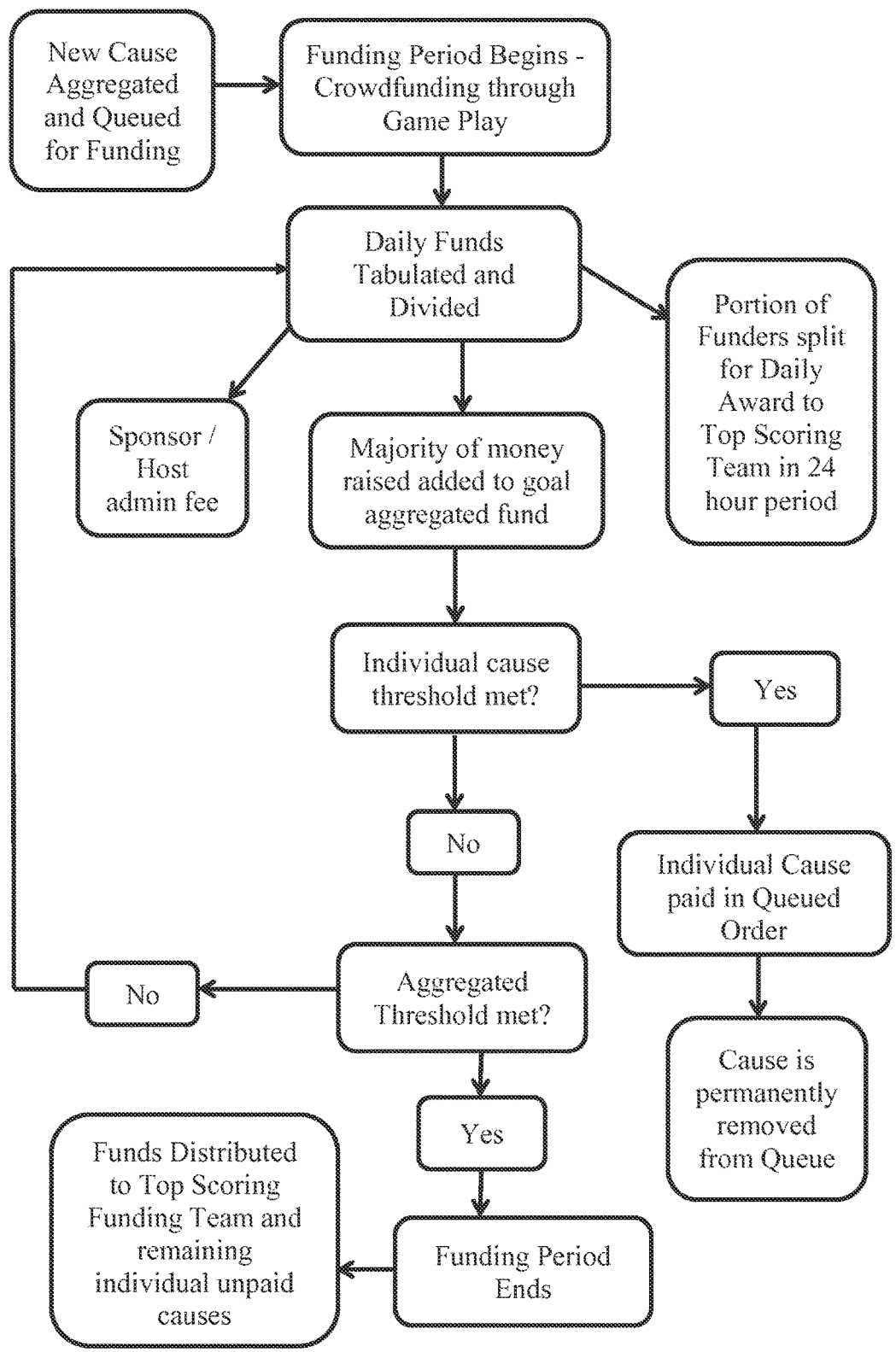
FIG. 1 is a diagram of the general relationship between the cause, the funders, the game, and the distribution of funds in an embodiment of the present invention.
Figure 11:
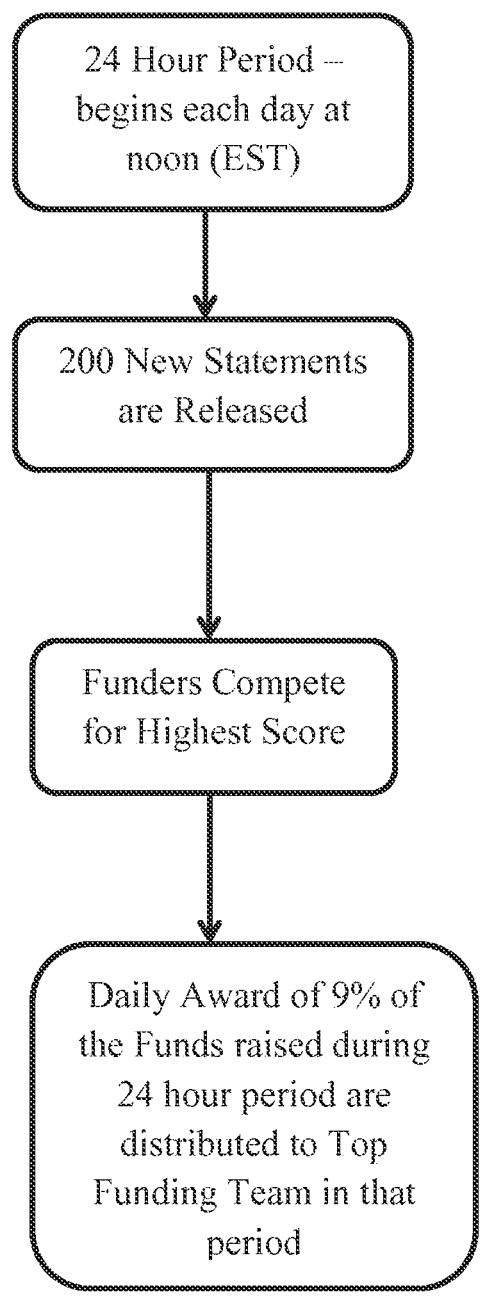
FIG. 11 is a diagram of one embodiment of the Daily Award.

FIG. 1 diagrams a combination of raising money for a cause with fee-based, entertainment games using crowdfunding. Large monetary goals are achieved through nominal, per-user contributions from the masses. In the present invention, a portion of the money paid in by users is applied to administer and service the game, but the remaining sums are shared equally with successful funders and with the designated worthy cause. In FIG. 1, a new cause is aggregated and queued to be featured for funding in a gamified crowdfunding round, or Funding Period. Each day in the Funding Period, the daily total of funds raised is tabulated. The funds raised during a single day are distributed at the end of each 24 hour period. See FIG. 11. Teams are reformed on a daily basis. With continuing reference to FIG. 1, a portion of the money raised is paid into a fund to be awarded to the high scoring Funding Team for the day and a portion of the funds are available to the host for servicing fees. In some embodiments installment payment may also be made to the cause. The vast majority of the money raised on a particular day is placed in the large, Funding Period fund. During the Funding Period funds may be disbursed to an individual cause as funds are raised at queued thresholds and such funds will be paid according to the queued order. When a loan is funded it is removed from the queue. The Funding Period ends when the aggregated goal amount is reached. At the End of the Funding Period, after the aggregated threshold amount is raised, all funds are distributed subject to overruns and deficits caused by unforeseeable interest rate variation. A portion of the funds are retained by the game host for administration and servicing fees, while the remaining funds are distributed between the top scoring teams and any remaining unpaid aggregated causes. If any overruns or deficits result after the funds are distributed, those overruns and deficits will be added to and recovered from the next Funding Period. In the exemplary embodiment, the individual causes are permanently removed from any Queue and replaced with new individual causes which are aggregated for funding under a new Reference Number.

Figure 2:
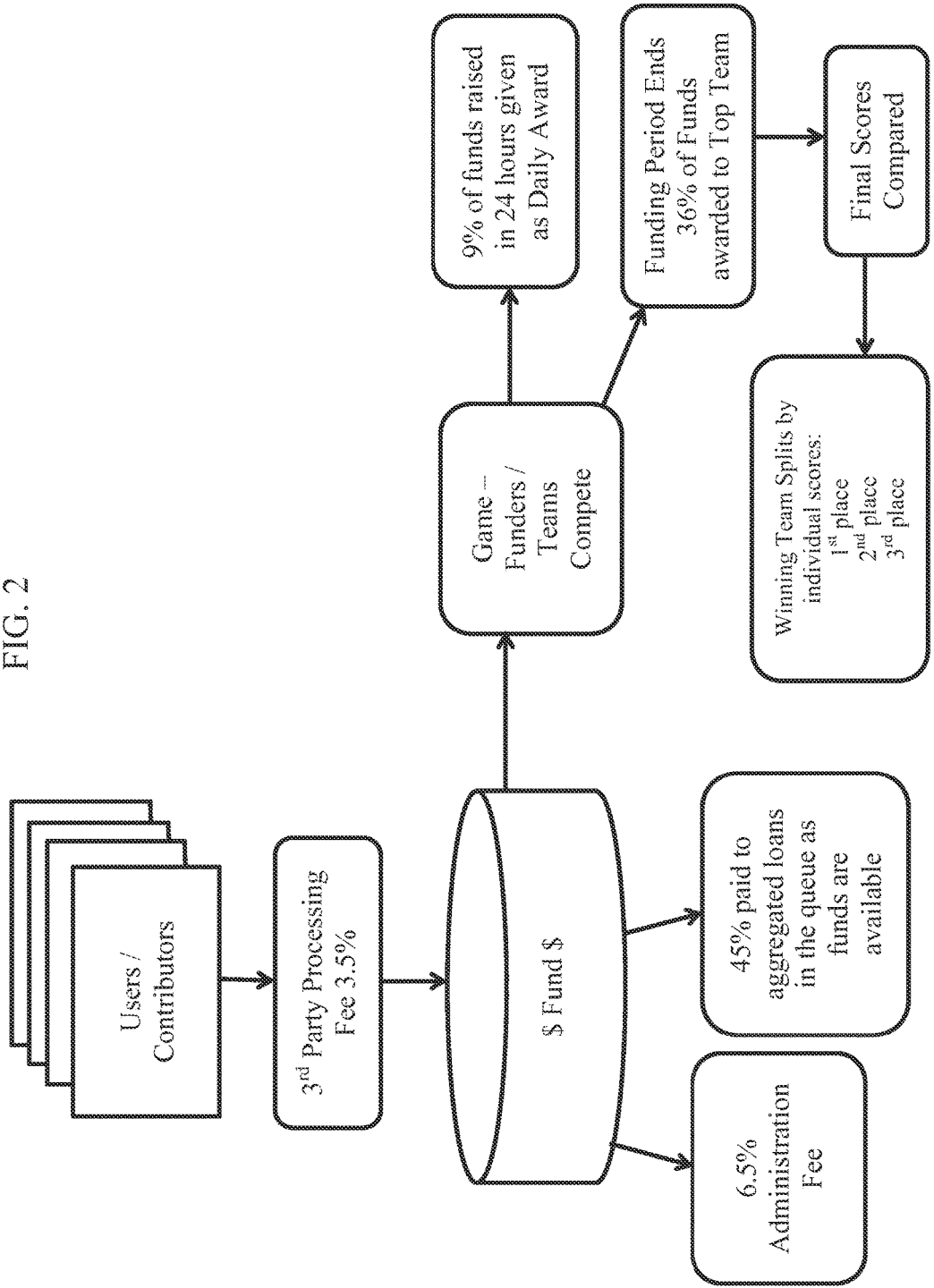
FIG. 2 is a diagram of one method of using the present invention for funding a cause.
Figure 3:
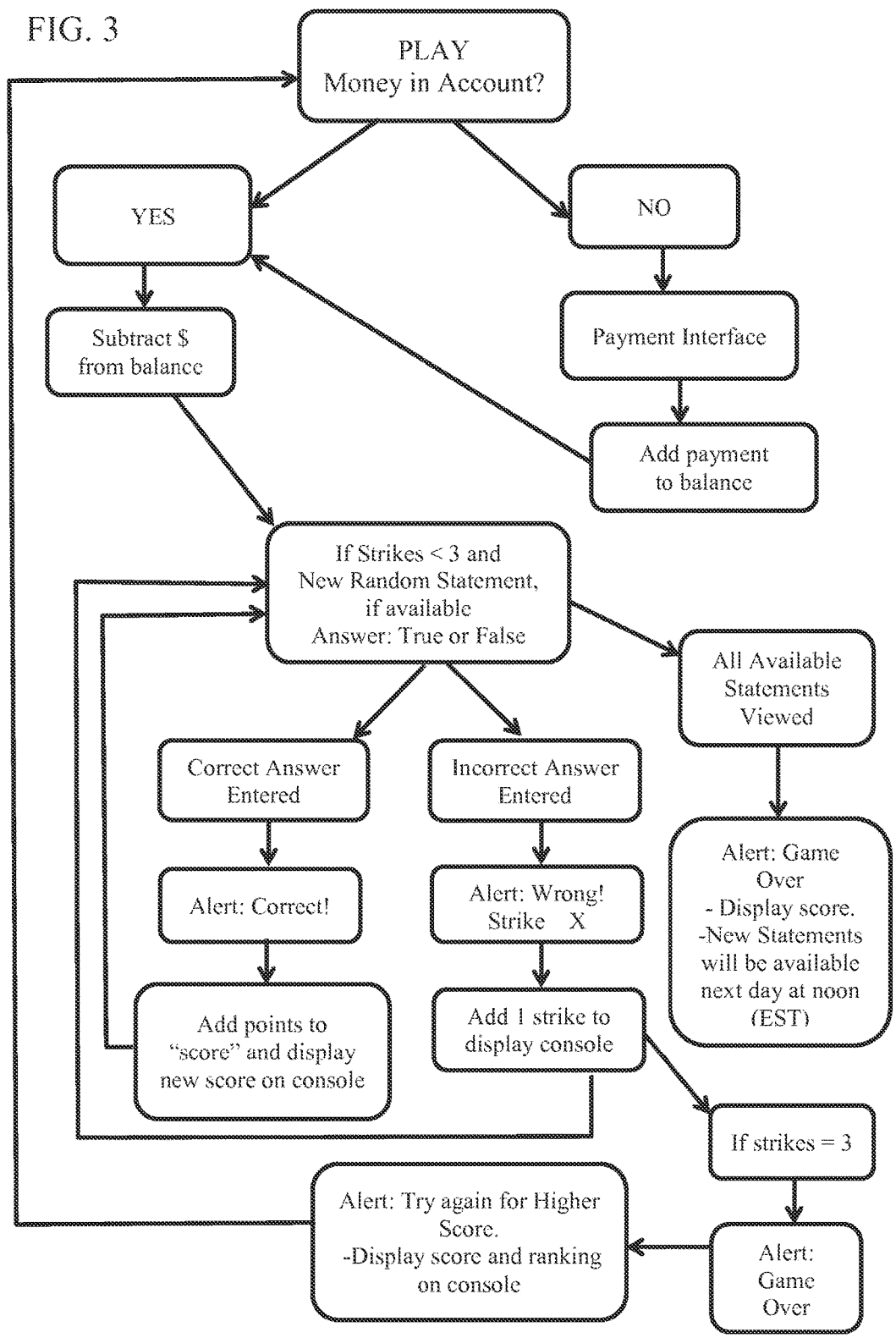
FIG. 3 is a diagram which illustrates a Funder's interaction with a Paid Play game according to one aspect of the present invention.
Figure 10:
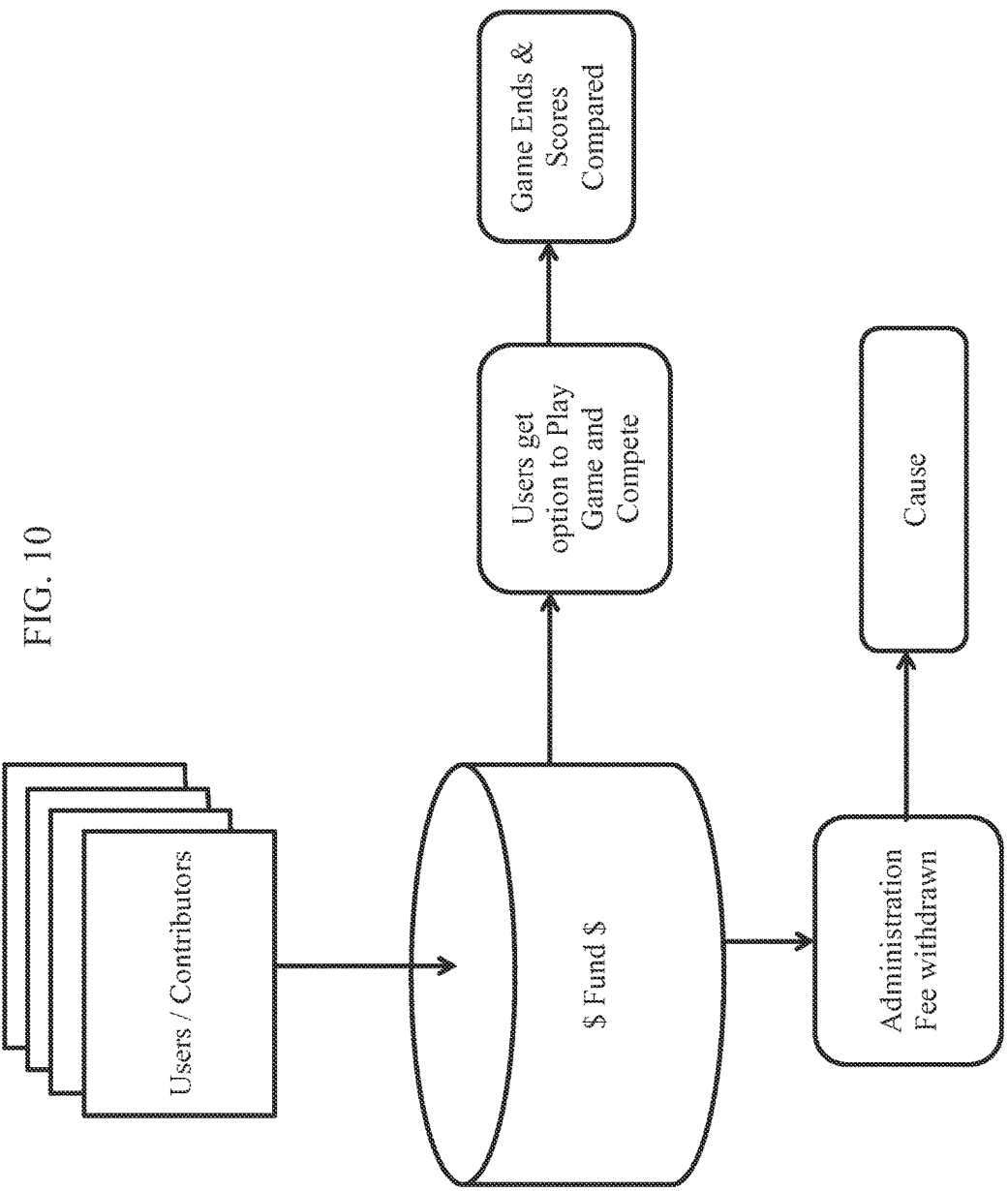
FIG. 10 is a diagram of an alternative funding method in which users contribute to a cause and as a result are provided an option to compete in a game.

Referring to FIG. 2, one method of funding is illustrated. After the masses are solicited (not shown), Funders contribute money toward a fund that will benefit a good cause. Under this method, the system will allow donors to a cause to have access to a game. The Funders have the option to compete in a game and may also compete with a team and against other teams of Funders. If a Funder is not interested in playing the game, he is not required to do so. If he does not participate in the game he is unlikely to share in any fund split. For Funders opting into the game, play is initiated in a game round. After initiating a game round, a Funder may be assigned to a Funding Team, the team earning the high score at the End of a Funding Period will share in a portion of the funds raised. At the End of the Funding Period, a fund is divided according to pre-determined share percentages. The net of the fund money is shared between the aggregated good cause and the team earning the highest score for the Funding Period and also teams earning high scores during Daily Award periods. A portion of the funds are retained by the host as administrative and servicing fees. The portion of the funds distributed to the team earning the highest Team Score may be shared among the team in proportion to their personal success in playing the game. Meaning, more money will be paid to teammate with the highest personal score on the team as compared to the money received by the second and third place teammates. In the one embodiment, when the aggregated cause is valued at $5 Million and the game host is seeking to raise a fund of $11 Million all inclusive, the team with the high Team Score for a Funding Period will share a $4 Million fund split. In this example, the first place team member will receive $1.75 Million of the winning team's share of the profits, leaving $1.25 Million and $1 Million to the second and third place teammates, respectively. Tie scores among Funder teammates will be distributed according to procedures herein. In this example, up to $1 Million is available for Daily Awards to be shared with Funders on Funding Teams earning the highest score during a Daily Award period. Then, $5 Million of the $11 Million raised will pay the featured student loans and associated tax consequences, subject to overruns and deficits which will be applied to the next Funding Period. The host will retain a portion of the money raised for servicing and administering the game.

Where permitted by law, FIG. 3 presents another method of using the system requiring users to pay-to-play the game of skill with nominal contributions. In this version of a gamified crowdfunding campaign, a Funder purchases vouchers or maintains an account balance with the host, typically through a bank, credit card, or other payment intermediary which will retain a percentage of the funds—usually around 3.5% (See FIG. 2). The Funder uses money contributed in that account for a right to participate in the competition. Continued participation may be contingent upon not exceeding an allotment of incorrect responses before additional payment would be required. Another method of using the system, not illustrated, will be to provide a free game to support a cause with a suggested donation for participation. Yet another method of using the system, illustrated in FIG. 10, will occur when the host is a not-for-profit organization which can receive donations and in exchange can host support a game for entertainment only.

According to the present invention, a good cause must be identified to be featured in the campaign being funded by the competitive game. A good cause may be a charitable cause as defined by local, state, or federal laws, but it may also be a cause which has moral, political, or economic attributes determined to be worthy of a community response. In the present invention any debt may be a worthy cause. In the exemplary embodiment, student loans are the featured worthy, good cause. Student loans affect one out of every three families in the United States. Even when borrowers are current on their student loans, the loans create a drag on the U.S. Economy, preventing graduating students from buying homes, marrying, and even having children. The rate of default on student loans is enormous. In the third quarter of fiscal year 2014, Federal Loan Defaults saw 7 million borrowers who had an average of $14,014 amount in default. For most individuals carrying student loan debt, the payments represent their second-largest monthly expense after their housing cost. Student loans cannot be discharged under current bankruptcy laws. In reality, student loan debt prevents many Americans from purchasing a home. As such, student loans are a burden on the economy. This burden is not isolated to the debtors themselves, but touches everyone with far reaching effects when funds that could be spent on other areas of commerce are instead spent on interest accruing on 30 year student loans.

Figure 4:
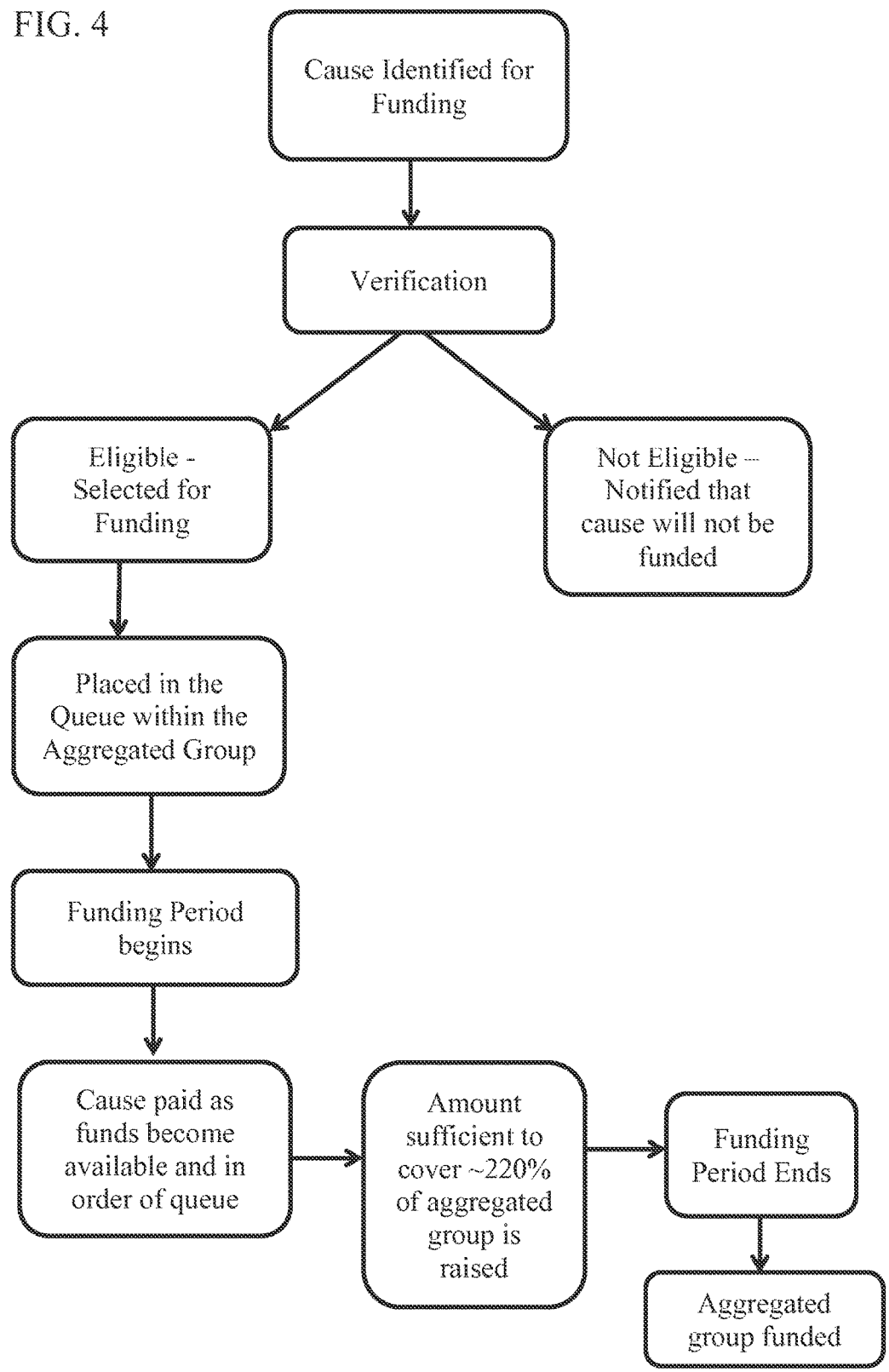
FIG. 4 is a diagram of an exemplary cause verification conducted by the host.

In order to verify that any loans featured in the exemplary embodiment are bona fide student loans from an accredited lending institution, the host will take steps to contact the lender and independently verify the existence and approximate amount of the loan. See FIG. 4. If the loan is verified as eligible, it will be placed in the Queue of the aggregated loans featured in a Funding Period. If the loan is determined to be not eligible, it will not be placed in the Queue to be featured for funding and the debtor will be notified of the problem. For loans placed in the Queue additional amount verification will occur. The host may verify the debt prior to loan being featured in the game or may verify the debt with a current statement and call the Holder for a loan payoff amount after the Funding Period or individual loan threshold has been achieved by the fundraising. The aggregated set of loans will be featured during a Funding Period. When the Funding Period ends, any funds raised and not already distributed according to the Queue will be transmitted to the lending institution. See FIG. 1.

Figure 5:
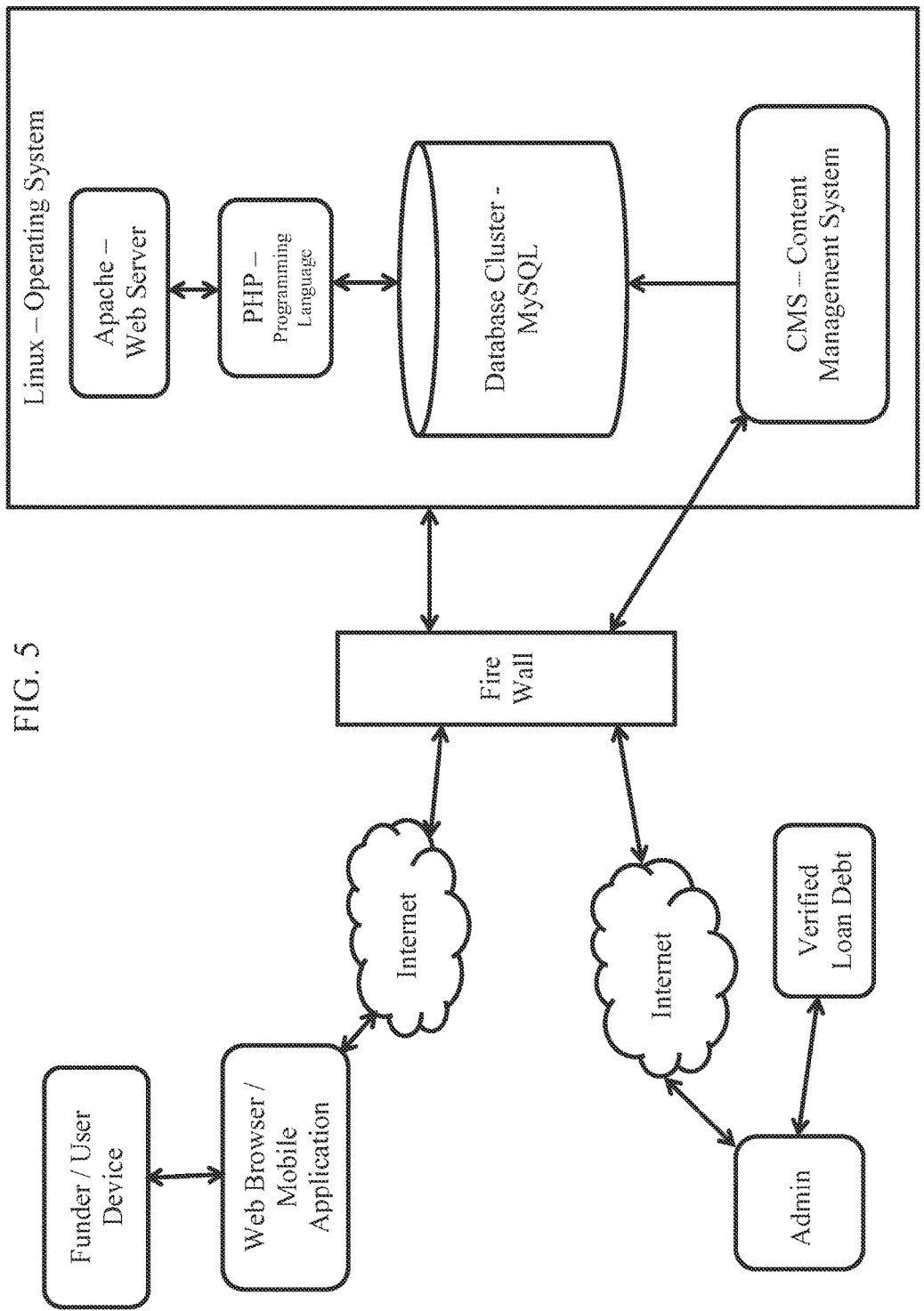
FIG. 5 is a diagram of one example of the interaction of a user and user device with the crowdfunding game administration through the network.

FIG. 5 illustrates one exemplary environment within which the present game may be implemented. The environment may include a Funder or user, a user device using a web or mobile browser or application connected to a network such as the Internet which interacts through a firewall with a server. Host administrators also interact with the server through the secure intranet to allow them to monitor and manage the game, update content and arrange for fund distribution. In the preferred embodiment, the user device may be any data processing device into which a user may review and respond to the crowdfunding game through the network. Typical user devices may include a mobile telephone, a computer, a lap top, a smartphone, a tablet, and so forth. The network may include the Internet or any other network capable of communicating data between devices. The online community may include any and all users of the network.

Figure 6:
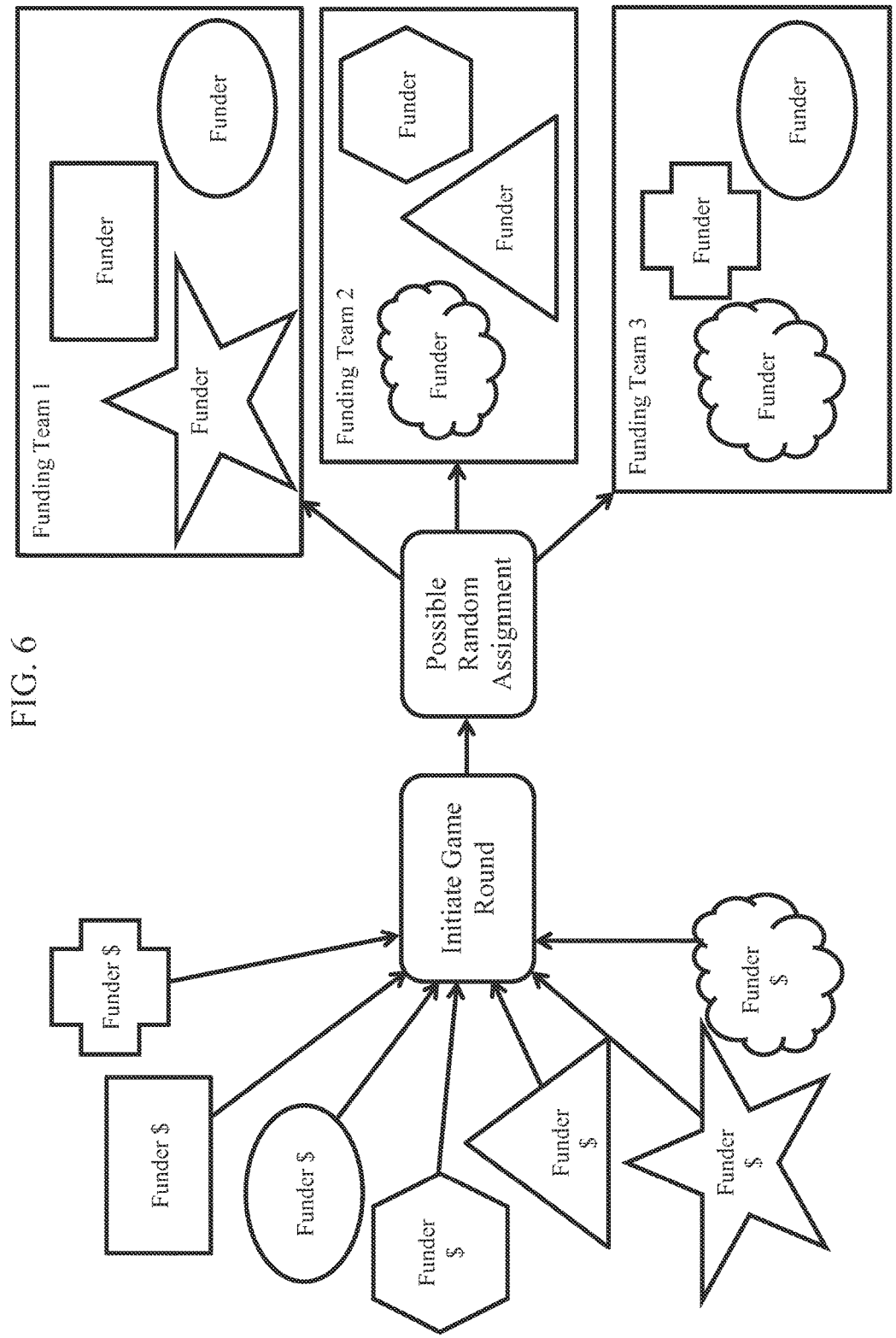
FIG. 6 is a diagram which illustrates how multiple users from a network can enter a game and may be randomly assigned to one or more than one team competing in the same game.

The participants or Funders of the game may be assigned to at least one team. One example of this assignment procedure is shown in FIG. 6. In this example, these teams are assigned randomly. In the exemplary embodiment, Funders may participate in both active and passive roles during a team's play. Various team assignments according to the exemplary embodiment are described in more detail below.

Figure 7:
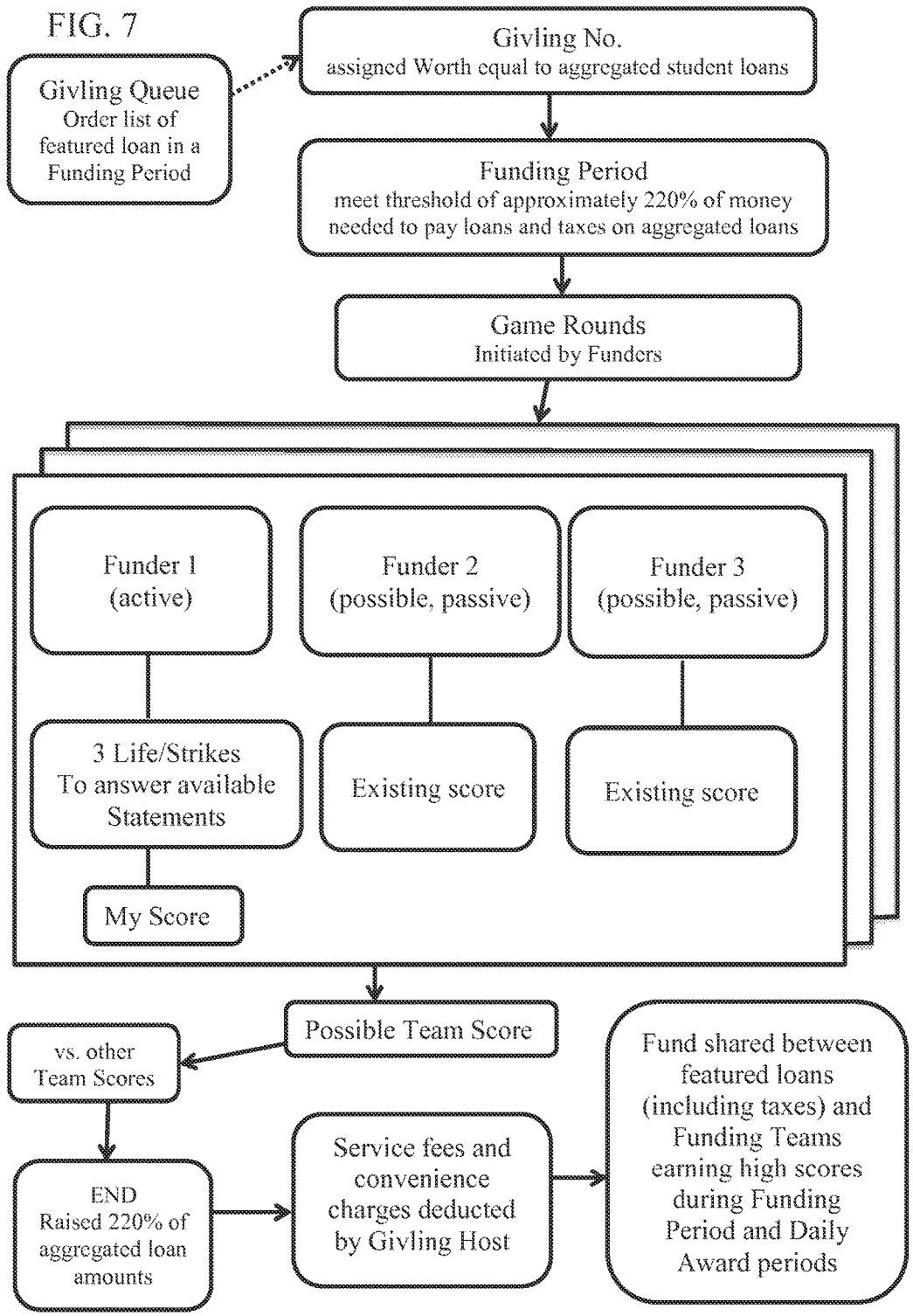
FIG. 7 is a diagram of play and terminology according to one embodiment of gamified crowdfunding.

FIG. 7 illustrates the game flow according to one exemplary embodiment of gamified crowdfunding, the procedures for which are included in the following paragraphs. Funders pay into a fund and become part of a competition. A Funder's ability to be a fund recipient (or not) will depend on many factors: 1) a Funder's trivia knowledge, 2) a Funders ability to return a correct answer, 3) within a time-controlled environment, and also enhanced by 4) these same abilities in a Funder's possible teammates. Participant Funders in the crowdfunding game help crowdfund student loan debts featured by the host.

In certain aspects of the game, no purchase is necessary to enter or share funds. In those cases, a purchase will not increase a Funder's chances of sharing funds. A Funder's odds of sharing funds will depend on the total number of entries received for the applicable Funding Period. The crowdfunding game is void where prohibited by law.

A Funder must follow the directions and any updates provided by the host and otherwise be bound by and follow the gamified crowdfunding rules to be eligible to receive a share of the goal fund in connection with any Funding Period.

The crowdfunding game is open only to legal residents of various States of the United States—including its commonwealths, territories and possessions who, at the time of play, are eighteen (18) years of age or older (except in the case of legal residents of certain states, territories, or possessions where the legal age of majority is greater than eighteen (18) years of age, such legal age of majority). Employees, officers, and directors (including immediate family members (spouse, parent, child, sibling and their respective spouses, regardless of where they reside) and members of the same household, whether or not related) of host and any and all other companies associated with host are not eligible to participate or be featured in any way. No aid or assistance may be given to anyone participating as a Funder. The crowdfunding game is subject to all applicable federal, state, territory and local laws, rules and regulations and is void where prohibited or restricted by law, rule or regulation.

Participating Funders sign up to play a crowdfunding game by first creating an Account. This is done by visiting the Web site, through social media sites such as Facebook or Twitter, or by downloading or accessing the App (mobile application) via a phone, tablet, or other personal computing device with access to a communication signal.

A Funder must sign up for an Account using his or her real name, email address and telephone number. If the information a Funder provides is false or inaccurate, the host has the right to ban a Funder from the Web site and/or app and also from receiving any funding shares. A Funder may use any user screen name or nickname he or she chooses in the Funder profile (which is viewable by other Funders) so long as the name is available and not obscene or offensive. A Funder may provide a lawfully owned or licensed photo or other image for a Funder profile at the Funder's option.

A Funder can only have one user account. If a Funder is found to be using multiple accounts, the Funder will be banned from the game and will not receive any funds. If a Funder has received funds, and is later shown to have multiple accounts registered, that Funder will be legally liable for repayment and associated costs.

Each student loan featured by the host will be grouped in a set with other student loans and the set will be assigned a Reference Number and will be Worth an aggregated amount of up to $5 Million ($5,000,000.00), which is the amount posted in association with that Reference Number. This amount represents the amount of money needed to pay off the lenders and tax authorities for a set of student loans. The amounts owed on each loan, have been verified by the host, on the student loans featured in a particular Funding Period. Overruns and deficits may occur due to variations in tax rates, interest rates, etc. Any deficit or overrun will be applied toward the next Reference Number. The Reference Number will assist administrators, participants, and Funders with distinguishing between the loan sets they have supported. The host reserves the right, at any time, to substitute any loan in a loan set, or an entire loan set at its sole and absolute discretion.

The Worth amount associated with the Reference Number also represents the maximum funds successful Funding Teams can earn in a Funding Period, some of which will fund Daily Awards. In other words, during an entire Funding Period up to $5 Million will be raised to fund a set of student loans and at the same time $4 Million will be raised for Funding Team earning the highest Team Score at the End of and for the entire Funding Period while up to $1 Million (over each Funding Period) will be earned by the highest scoring Funding Teams in Daily Award intervals. The highest scoring Funding Team at the End of a Funding Period will divide $4,000,000 so that the first place Funder on the Funding Team will earn $1.75 Million, the second place Funder on the Funding Team will earn $1.25 Million, and the third place Funder on the Funding Team will earn $1 Million. Daily Award team shares will vary but will be divided among the high scoring Funding Team members according to the same percentage shares as for the Funding Period fund portion. In this embodiment, the percentages set at 43.75%, 31.25%, and 25%, but any incentivizing percentages could be implemented. Each Funding Team member is fully responsible for any and all applicable federal, state, territory and local taxes (including income and withholding taxes) associated with or due relative to any earnings.

After creating an account, a Funder is awarded one Free Play per day. A Free Play must be played on the day it is granted, or else it is forfeited. A Free Play may not be accumulated, transferred, shared, or exchanged for value. In other words, Funders receive one Free Play per 24-hour period. These plays do not accumulate over time. Example: If a Funder uses a Free Play, another will be available after 24-hours. If a Free Play is not used one day, there will not be two Free Plays available when the Funder logs-in the next day. There will be only one.

In this exemplary embodiment, the daily Free Play does not fund the Funding Period or any portion thereof, meaning it is not added to the accumulated funds used to satisfy the Reference Number Worth for the Funding Period nor added to the funds which help fund the Daily Award. In other words, the Free Play is not added to the value of the funds raised. Only the purchase of Game Coins adds value to the Funding Period or Daily Award. However, the Score earned in each daily Free Play is treated as though it was earned during a paid round and the score counts for competitive purposes. Just as for paid rounds, a Funder using a Free Play is an active Funder for one Game Round and may be added as a passive Funder for one, possibly two, subsequent Game Rounds.

A Funder may purchase a token called a Game Coin and play that Coin to participate in a Funding Period and such participation automatically makes the Funder part of a Funding Team competing for a Daily Award. A Game Coin may be purchased one at a time, in small bundles, or in bulk. For example, a single Game Coin may be purchased for $0.80 each or bundled in sets, such as 20 for $10.30 but the prices are always subject to change. The money used to purchase Game Coins goes toward the goal fund which is split as follows: (1) to fund the student loan and associated interest and taxes; (2) to fund a Daily Award to the Funding Team with the highest daily score; (3) to fund the Funding Team with the highest Team Score for the Funding Period; and (4) to fund the game site administrative handling, servicing, and processing fees. Once a Funder buys game credits or Coins, no refunds will be provided. The Funder may use the credits to play out his or her rounds.

For each Game Coin used, a Funder is awarded a set of three lives, or put another way, a Funder can play the game until he or she misses three questions or Statements or has viewed all available trivia statements. One life is terminated each time a Funder receives a Strike. A Strike is accumulated each time a Funder answers a question or Statement incorrectly or exceeds the time permitted to return an Answer. A Funder completes his or her participation in a Game Round when either (1) he or she has accumulated three Strikes, or (2) he or she provides an Answer to all 200 questions or Statements available to that Funder in the Game Round without getting more than two incorrect, whichever occurs first. A Funder may use purchased Game Coins to play additional Game Rounds even during the same Daily Award Period or Funding Period. There is no limit to the number of times a Funder may participate in a single Funding Period and Daily Award Period so long as there are still unseen trivia statements. Funders may continue to play with one or more Givling Coins until they have viewed all of the Statements available to them in a Daily Award period. A new set of 200 statements will be added every day at 12:00 p.m., Eastern Standard Time. A Funder may re-enter the game for another set of Statements after that time.

A Funder can only play a Game Coin, when there is at least one round open for playing. Should that Funder's coin satisfy that Funding Period goal amount or be the final coin posted in any 24 hour period or in a Funding Period, then that Funder will be the final contestant in that period. A future Funder will be competing in the next Funding Period clearly posted when the Funder pays his Game Coin. The final Funder in the previous period will be permitted to complete his Game Round, uninterrupted. In other words, if the Funder can get in and pay his Game Coin before the period's funding amount is achieved or the current Daily Award period expires, then the Funder's Game Round will be completed without impediment.

Each time a Funder participates in a Game Round he or she may be randomly grouped with other Funders to create a Funding Team. See, e.g., FIG. 6. A new Funding Team is created each time a Funder initiates a Game Round within the Funding Period. Other Funders who have already played a Game Round and received a score may be randomly assigned as teammates for a current, active Funder. Thus, Funding Teams are formed of two types of Funders: one active Funder and one or more passive Funders.

A randomly formed Funding Team of Funders may be created each time a Funder initiates a Game Round. The team may be created by the active Funder initiating a Game Round of trivia. If assigned to a team, an active Funder can view his or her scoring relative to the scores of the passive Funders. A passive Funder may or may not be able to view an active Funder's progress in the Funding Teams to which their score is assigned. A passive Funder has already completed a previously played active Game Round where they were able to have the active Round experience.

A Funder only plays one Game Coin for his or her active Game Round. The possible assignment to one, sometimes two, additional Funding Teams on a passive basis is a free benefit which may be provided with the purchase and play of a Game Coin.

Figure 8:
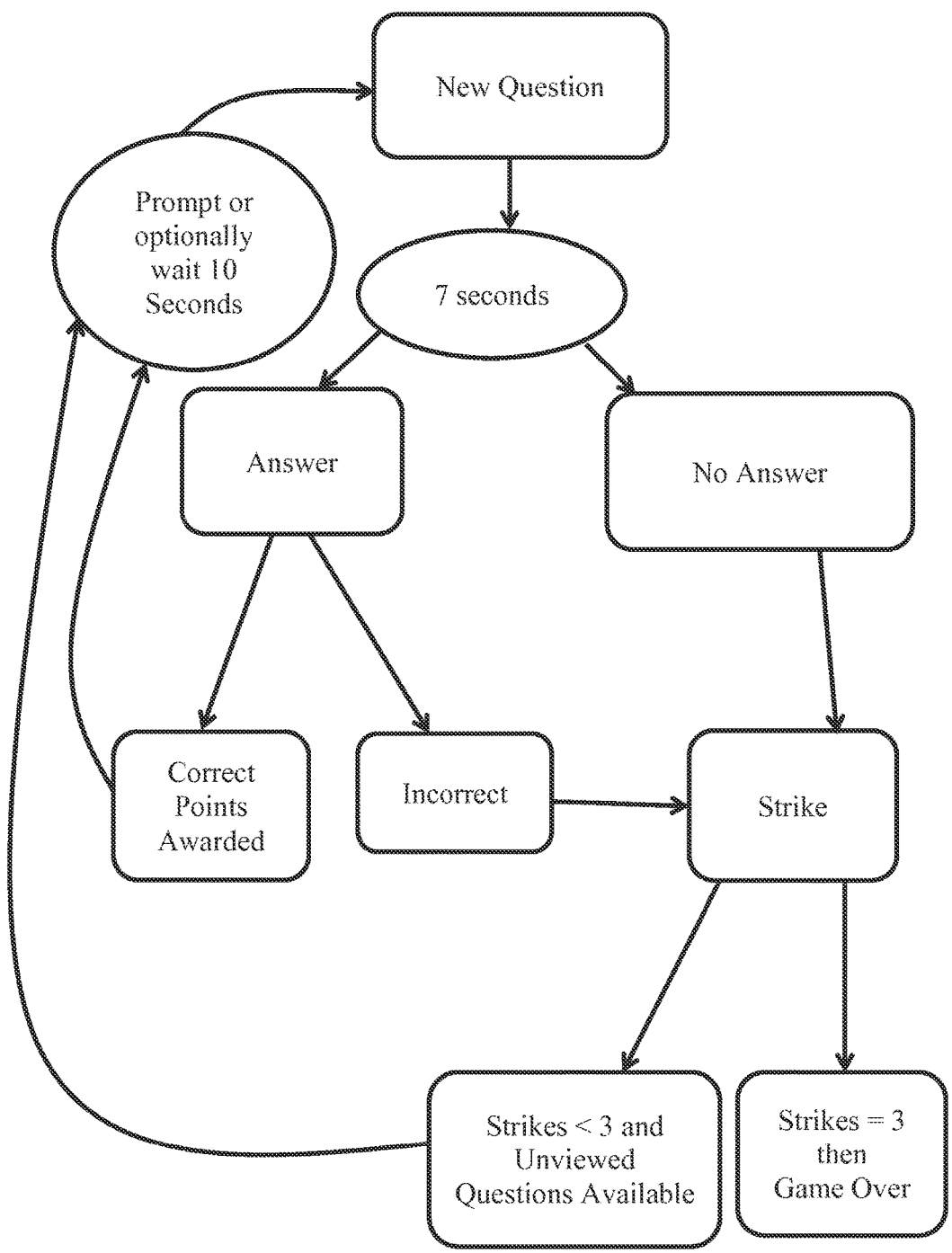
FIG. 8 is a diagram which illustrates one example of time limitations placed on Funders to provide correct responses to game challenges.

During the Game Round, a Funder is allowed seven (7) seconds to respond to a short Statement by selecting a True or False Answer. See FIG. 8. Other trivia formats may be incorporated into the game at any time. Once an Answer is rendered the Funder is immediately provided feedback that either the Answer was correct and the Funder is awarded points to increase My Score, or the Funder is notified that a Strike has been accumulated due to an incorrect or untimely Answer. A feedback screen display also presents a button by which a Funder may immediately demand the Next Question, or Statement. If the Funder does not use the button, the Next Question, or Statement will automatically appear after the expiration of a preset time, such as ten (10) seconds. See FIG. 8.

Figure 9:
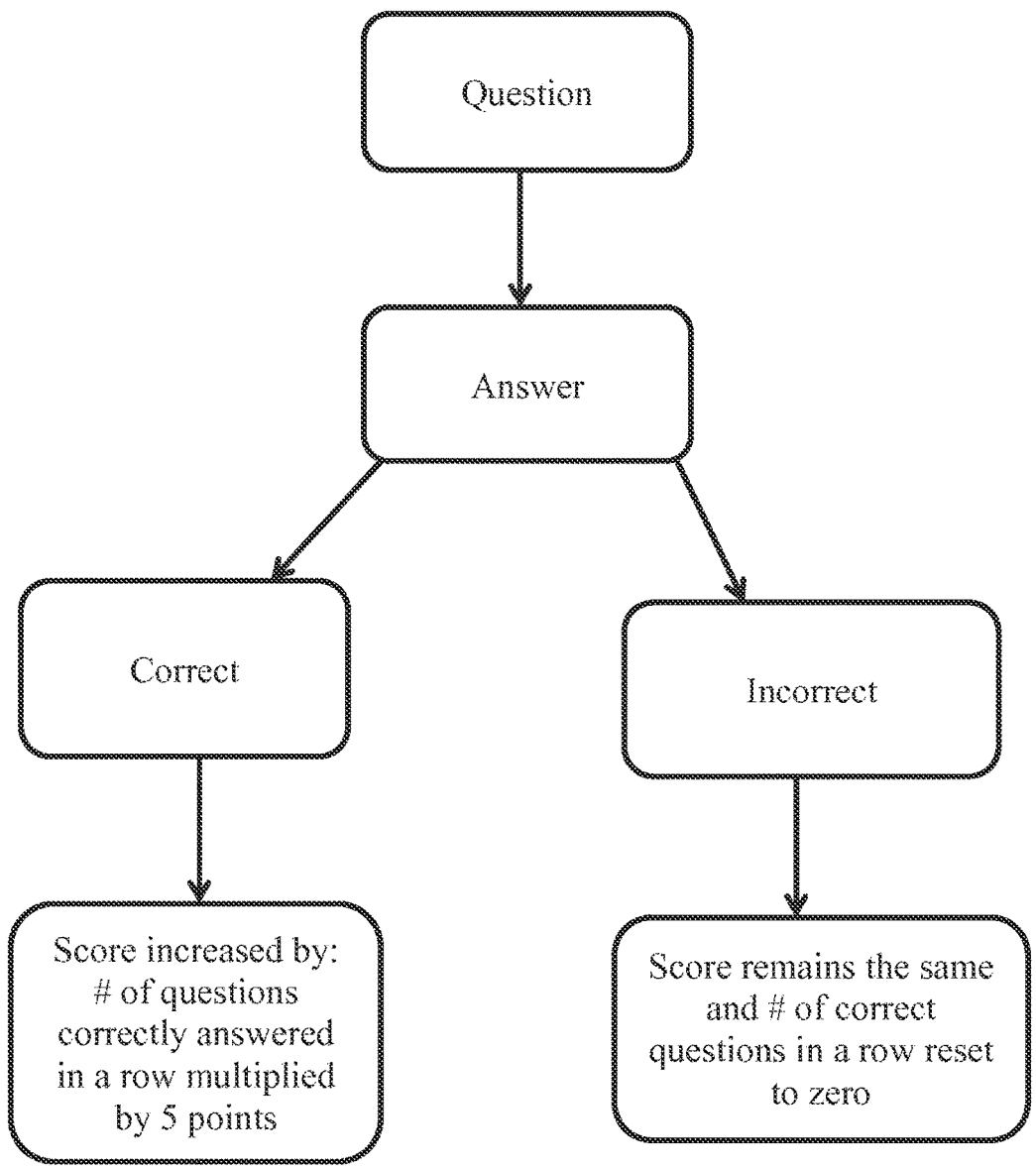
FIG. 9 is a diagram which illustrates one sample of a scoring paradigm which may be applied to a game of the present invention.

Each Statement is randomly generated from a Statement database for each play of the Game Round, so that each Funder will view a unique sequence of Statements. A Funder receives points for each Statement that he or she answers correctly. Each subsequent Statement after a correct Answer has a higher point value, for example, the first correct Answer is worth 5 points and each correct Answer without an intervening Strike continues to increase by intervals of 5 points (e.g., 10, 15, 20, etc.). See, e.g., FIG. 9. A Strike resets the points value for the next correct Answer back at 5 points. Each time a Statement is answered incorrectly, a Strike is generated. When a Funder has accumulated three Strikes, the Funder's active Game Round ends.

A Game Over reporting display screen is returned after three Strikes are accumulated by a Funder. The Game Over screen reports the following: (1) the Funder's score as it relates to any relevant passive Funders on the Funding Team associated with the Funder's active Game Round; (2) the Team Score for the Funding Team; (3) the respective amount of time remaining in the Funding Period and Daily Award period for the featured student loans; and (4) the Leader Board for the Funding Period and the specific Reference Number and the Funder's standing relative to those leaders. Funders should not take any action in reliance on having their score labeled as "high score" in any round. Final scores will only be posted well after the close of any Daily Award or Funding Period. A Funder may choose to play again, return to his or her Account, or leave the game.

Each Reference Number is featured until it is fully funded; however, student loan funds will be disbursed to pay off loans in the queue as sufficient funds are raised during the Funding Period. Loans will be funded in the order they appear in the loan set queue.

When the current Reference Number is totally funded, the Funding Period ends. A new Funding Period with a new set of loans associated with a new Reference Number will begin. The funds still needed to satisfy the Funding Period will be displayed. Each 24 hour Daily Award period will occur from 12:00 p.m. until 11:59 a.m., Eastern Standard Time. The host or server clock shall be the official clock of each pertinent game time and will run on Eastern Standard Time.

When participating through a network, Funders may see an advantage to participating in games using a web browser on a computer with a wire connection, rather than by way of wireless devices such as smartphones and tablets. Play through wireless devices leaves Funders at risk of losing their connection or their Answer not being transmitted within the allowed timeframe. Times are recorded and measured by the official host clock and all measurements by that clock are final and binding on Funders. Communication using a wireless or cellular device may cause an interruption in the communication between a Funder's device and the server, which may cause a Funder's answer to be recorded as untimely. The host cannot and does not accept any responsibility for any interruption, delay or inconsistency in communication between a Funder's device and the host server resulting from a delay in communication through wireless, cellular or other networks, and cannot accept any appeals resulting therefrom. No refunds will be made on account of any such interruption, delay or inconsistency.

A new Reference Number will appear when the prior Funding Period Ends. Each Funding Team will be disbanded and new Funding Teams will be formed within each new Reference Number's Funding Period according to the rules. New Funders who initiate the first two Game Rounds of Funding Period may be paired with the scores of two Funders with Game Rounds from the previous Funding Period.

A Funding Period will not end until the aggregated value of the loans in a set assigned to a Reference Number has been totally funded. Each day, the funds raised within the prior 24 hour period (running 12:00 p.m. to 11:59 a.m. on the host clock) will be tabulated and then twenty percent (20%) of that day's funds available for the Funder's 45% Funding Period split will be allocated to the Funding Team earning the highest Team Score in that daily round period. Stated another way 9% of funds raised every day are paid to top scoring Funders participating in that 24 hour period. See FIGS. 2 and 11. The remaining daily funds will be added to the Funding Period total. During the Funding Period, student loan funds will be disbursed as the funds raised meet the amount owed for each loan in the queued order. When a the next threshold amount sufficient to meet the next loan in the Reference Number set queue has been raised it will be paid towards the student loans, according to the queued order within the set. When the monies needed for the final student loan in the queue have been raised, the Funding Period ends and the funds are shared between the Funding Team earning the highest Team Score and divided among the highest scoring Funding Team, as detailed herein.

To be victorious in a Funding Period, a Funder must be a member of the Funding Team which accumulates the highest Team Score for the Funding Period. The Funding Team with the highest score will share $4 Million according to the preset rules. The Funding Team with the highest score for the entire Funding Period will also have been the winner of one of the Daily Awards in that Funding Period. The aggregated Funding Period and Daily Award funds available to successful Funders are approximately equal to the amount paid to the total set of student loan debtors, which amounts may only differ slightly due to tax or interest rate variations.

In a Funding Period, Funders are not only competing as members of a Funding Team against other Funding Teams, but they may also be competing for the best score within their own Funding Team, if assigned to such a team. As an active Funder accumulates points in his Game Round, he may surpass the scores of his teammates, if he has them. Each time a Funder passes a teammates' score, he or she may be awarded Bonus points. He or she may also receive Bonus points for responding to questions more quickly than other Funders. These Bonus points may be displayed to the active Funder on the Bonus Board during his Game Round.

At the End of a Funding Period, a Funding Team earning the highest Team Score will be identified. Within that team, the Funder with the highest individual score (called "My Score") as compared with his or her teammates will be awarded more money than the second and third place Funders. The second place Funder will be awarded more money than the third place Funder on his or her Funding Team. In the preferred embodiment, this means that when the Funding Team with the highest Team Score divides the funds, it will be as follows: $1.75 Million to first place on the Funding Team; $1.25 Million to second place on the funding team; and $1 Million to third place on the Funding Team. See, e.g., FIG. 2. In the event of a tie between Funding Teams, the money will be awarded to the Funding Team who first registered the high score according to the official clock. In the event of a tie between team members, the funds will be split in the following proportions: $1.5 Million (1st), $1.5 Million (1st), and $1 Million (3rd) split when first place ties and a $1.75 Million (1st), $1.125 (2nd) and $1.125 (2nd) split when second place ties.

Each Funder on a high scoring Funding Team will receive a Notice of Funding Team High Score. Each Funder on a high scoring Funding Team will be required to privately (through phone, email, or other secure, private means) provide his/her name, address, age, tax identification number, and other personal information necessary to receive the reward. In the event that any potential winner does not respond to any such Notice of Funding Team High Score within forty-eight (48) hours of the time of issuance, fails to provide all information necessary to receive the fund split, or declines the funding split for any reason, a disqualification will result, the funding split will be forfeited. The forfeited amount, less legal and administrative fees, will be added to the next Funding Period. Each potential funding split recipient may be required to submit his/her valid social security number and/or other identification to host and may be required to execute, have notarized and return an Affidavit of Eligibility and Release of Liability and Publicity unless prohibited by law, within forty-eight hours of the time of issuance. Failure to submit any identification required by the host or failure to return the required documents within the specified time period, or noncompliance with rules, or the return of any funding split (or any portion thereof) or Notice of Funding Team High Score as undeliverable may result in disqualification and funding split forfeiture. The forfeited amount, less legal and administrative fees, will be added to the next Funding Period.

The host will initiate disbursement of funds in U.S. Dollars to the Funding Team with the highest Team Score within 72 hours of the completion of the Funding Period via a company check from a bank or another financial institution. All bank, transfer, or special processing fees, costs or expenses incurred are the sole responsibility of the receiving Funder and will be deducted from their winnings There may be additional delays between the end of a Funding Period and access to any of the funds raised.

All Statements and Answers are double-checked by two, separate host staff members. However, should an incorrect statement/answer match occur, the host will NOT correct the incorrect answer during a Daily Award period, and will leave the scoring in place as if the statement and answer were correct. If the host is alerted to the incorrect Answer, the host may choose to remove the Statement from the database or will make an effort to correct the Answer should the Statement appear in later Daily Award periods.

If the host detects hacking and/or cheating during a Daily Award period and no simpler remedy is available, in the host's sole discretion, that Daily Award period may be stopped, and all credits played during that period may be returned to Funders' accounts and applied to future rounds.

If the host detects hacking and/or cheating after funding has been distributed, host reserves the right to demand restitution if the hacking and/or cheating party was one of the recipients of a funding split. No refunds will be made to any of the Funders of that specific Funding Period, but the refunded amount, less legal and administrative fees, will be added to the next Funding Period.

The host maintains the right to ban anyone from the site who cheats or attempts to cheat while playing the game. Funders generating Answers by a script, macro or other mechanical or automated means will be disqualified. The host may maintain a list of Funders sharing in funding splits and Funding Teams. This concludes the detailed methods used by Funders for one exemplary embodiment according to the present invention.

In the exemplary embodiment, the debtors agree to all of the following:
    providing the host with his or her loan account number and a copy of the most recent student loan statement so that the host may verify the existence, nature, and the amount of the loan;
    signing the necessary documents to provide a representative of host with permission to speak with the bank/lender, to verify the loan amount, and to make arrangements to make payments on the loan;
    providing the host with his or her social security number to assist in completing the loan investigation and pay off process which may also include reporting the payment to tax authorities. (Until host has complete loan information, the loan cannot be featured in the gamified crowdfunding.);

acknowledging that host will only offer student loans for funding when they are held by education lenders, including the Federal Stafford Loan, Federal PLUS Loan, Federal Consolidation Loan, private education loans, and private consolidation loans or entities otherwise recognized by the federal government as lending institutions with the loans being designed as "student loans;"

acknowledging that any other "loans" (such as those from individuals or employers) will not qualify to be featured in the trivia game;

acknowledging that participation in the gamified crowdfunding program has no cash value and cannot be leveraged, sold, devised, or otherwise assigned.

acknowledging that should the loan be paid, forgiven, or otherwise terminated at any time prior to the host transmitting funding to the bank/lender, the host shall have no obligation to pay any amount to the debtor, the loan holder, nor any heirs or assigns. (Any overruns that result from this situation will be applied to the next Funding Period.);

granting the host permission to use general loan information as well as debtor's name, likeness, photograph, voice, and personal and biographical information for promotional and marketing purposes. Such marketing may occur on social media and third party websites including but not limited to Facebook®, Google+, Twitter®, etc.;

signing additional documents and release forms in order to give host and its sponsors permission to use the information for these and other promotional purposes without further compensation. NOTE: General loan information, personal and biographical information does not include loan account number or social security number which will not be publicly displayed;

acknowledging that the host may verify the outstanding loan amount with the bank/lender up to 5 business days before the loan is featured. Any late fees or penalties that accumulate between the date a debtor is selected and the date the host verifies the loan amount may not be included in the amount featured for potential Fund. Also any late fees, penalties and interested accumulated between the date the loan is verified and the date any funds are transmitted may not be included in the featured amount. The remaining amount provided by the lender will be posted as eligible for funding by participants in the trivia game;

acknowledging that Debtor's loan will be featured along with a set of other student loans in a single Funding Period but may be paid as funds become available in that Funding Period depending on your location in the queue of those loans assigned to that Funding Period;

acknowledging that the amount raised may not be sufficient to fund any portion or the total amount of the student loan. However, in the exemplary embodiment any amount that is raised within the Funding Period where the Debtor's loan is in the queue for funding will be shared as follows: approximately 45% of the crowdfunded amount will be distributed directly to the bank/lender to pay down the loans in the Funding Period queue in the order they appear in the queue; approximately 45% of the crowdfunded amount will be distributed to highest scoring Funding Teams participating in the trivia game; the remaining funds will be used by the host to service and administer the game. The host will initiate the direct funds transmittal to the bank or entity holding the student loan as funds become available to fund loans according to the order they appear in the queue, but in no case longer than five (5) business days following the completion of a funding period.

The host cannot and does not guarantee that the loan principal, interest, fees, penalties, or associated tax liability will be paid in part or in total. All marketing efforts by host are made with the goal to fully fund the loans featured on the site as early as possible after posting; however, full-funding may not be achieved and is not guaranteed. This means that having a loan featured in gamified crowdfunding is not a guarantee that it will be paid, or paid off. Debtor must agree and acknowledge that he or she continues to be completely and 100% responsible to the lending institution for the entire amount of the loan (including all principal, interest, and fees) until and unless the loan may be paid.

Debtor is always responsible to correctly report and also pay any tax liability associated with, or assessed on funds transmitted to any bank/lending institution on the debtor's behalf. The host is not responsible for any taxes owed as a result of funding through the game; however, the host will make an effort to set the goal fund to include a funding request to cover such anticipated amounts in the funds distributed after the close of the Funding Period. In order assist in this effort, Debtors are required to request and pay for an opinion from an Accountant as to what the anticipated tax liability may be to the Debtor should his or her loan be paid in full by a third party. The Accountant must provide a notarized statement to the host with the opinion.

By agreeing to participate in the gamified crowdfunding program, the Debtor must release the host, its agents, and all participating sponsors from any liability as a result of participation. If any portion of this program becomes impossible due to technological barriers, an act of God, war or terrorist act, Debtor must release host, its agents, its funders, or any of its participating sponsors from any claims. If it is determined that any portion of the program may be a violation of any rule or regulation or is otherwise deemed unlawful, Debtor must agree that the entire program may be cancelled without recourse against host, its agents, its funders, or any of its participating sponsors. This concludes the special constraints applicable to the Debtors in the exemplary embodiment.

An exemplary embodiment of the present invention provides a method and system for the gamification of crowdfunding for a cause through a profit-sharing game of skill over a network where the profits of the game are shared between the cause and the participants after administrative fees are deducted from the gross contributions. The system comprises a host, a cause, a user, at least one user device, a host computer (server) with a processor and memory containing programming instructions, a game of knowledge or skill stored on the computer, a user-to-host interface, an account to hold and distribute funds, and a network to communicate game interactions and funds transfers.

The present invention further comprises an online crowdfunding combination of a fee-based game provided to entertain users, a competitive trivia tournament, and a fundraising campaign seeking to accomplish a larger monetary goal by asking for nominal, per user contributions from the masses.

The present invention further comprises a method and system for crowdfunding comprising the steps of combining a game of skill with fee-based participation by a plurality of funders interacting over devices communicating over a network, wherein the plurality of funders each pay a nominal fee and the fees are aggregated into a crowdfund, wherein all profits of the game are shared between a beneficiary fund and funders displaying the most skill in the game after an administration fee is deducted from the crowdfund. The beneficiary fund is distributed to pay down student loan debt.

In the present invention, an improved system for crowdfunding comprises the provision of a host, a cause, a plurality of users, at least one personal device per user, at least one host device with a processor and memory containing programming instructions, a game of skill stored on the host device, a user-to-host interface, an account to receive, hold, and distribute funds, and a network to communicate game interactions and the transfers of the funds, wherein a percentage of the distributed funds are paid to the host, a percentage of the distributed funds are paid to users, and a percentage of the distributed funds are paid to a beneficiary. Users accumulate scores according to their success in the game. The game has intervals of participation but scores compete until the fund goal is reached. Users are assigned to teams with at least two other users and the scores for each user on the team are added to form team scores. Team scores are ranked against other team scores in the game and the highest team score is awarded the percentage of funds paid to the user. Scores for users compete with scores of other users on the same team and a larger proportion of the portion of the funds paid to the team is paid to the users scoring the best within the team. Users are reassigned to teams each day. Scores are tabulated on an ongoing basis until a predetermined fund amount is reached. User participation is unlimited.

Although the disclosure hereof is detailed and exact to enable those skilled in the art to practice the invention, the physical embodiments disclosed herein merely exemplify the invention which may be embodied in other specific structures. While the preferred embodiment has been described, the details may be changed without departing from the invention.

It is further intended that any other embodiments of the present invention which result from any changes in application or method of use or operation, method of manufacture, shape, size, or material which are not specified within the detailed written description or illustrations contained herein are yet considered apparent or obvious to one skilled in the art are within the scope of the present invention.

I claim:

1. A gamified crowdfunding system comprising:
at least one user device comprising a memory containing programming instructions that when executed by a processor causes the user device to perform the steps of:
providing a series of challenges to be attempted by a plurality of players, each player being assigned to either of a first or second team in which each player is an active player and wherein each active player earns an active score, the first team further having at least one other player as a passive player represented by a passive score, wherein the passive score is comprised of an active score of an active player of the second team,
charging a nominal fee to each active player attempting the challenges,
aggregating the nominal fee from each player to create a fund,
awarding a first portion of the fund to a winning team determined to be that which is most successful in completing the series of challenges based on comparing aggregated team scores for each team, wherein aggregated team scores include active and passive scores,
awarding a second portion of the fund to one or more student loan debtors, and
awarding a third portion of the fund to one or more game administrators.

2. A method comprising:
hosting a game of skill,
making the game of skill accessible to devices communicating over a network,
accepting a plurality of players to participate in the game of skill via devices,
charging each player a nominal fee to participate in the game of skill,
assigning each player to a first team in which the player is an active player, the first team further comprising at least one other player as a passive teammate,
setting game success measurement standards through which the active player earns a game score,
assigning the game score of the player to at least one additional team where another player will be the additional team active player and the player becomes the passive teammate,
accumulating a fund from the nominal fee paid by each player,
tabulating a team score wherein the game score of the active player and the passive teammate are combined,
comparing the team score for each team and declaring a winning team,
awarding a first fund portion to the winning team,
distributing a second fund portion to at least one beneficiary, and
reserving a percentage of the fund to pay an administrator fee.

3. The method of claim 2, wherein the first fund portion and the second fund portion are equal.

4. The method of claim 2, wherein the at least one beneficiary is at least one student loan debtor having a student loan debt.

5. The method of claim 2, wherein the at least one beneficiary is an aggregated group of student loan debtors each having student loan debt.

6. The method of claim 5, wherein the aggregated group of student loan debtors are placed into a queue.

7. The method of claim 6, further comprising paying off the student loan debt in order of the queue.

8. The method of claim 2, wherein the nominal fee is less than $1.00 USD.

9. The method of claim 2, further comprising establishing a goal for the fund at least as high as $11,000,000.00 USD.

10. The method of claim 2, wherein the method further comprises:
ranking the game score of each player within each team,
awarding a larger proportion of the first fund portion paid to the winning team to the players of the winning team based on the rank of each player within the team.

11. The method of claim 10, further comprising:
dividing the game of skill into a plurality of award periods which together encompass an entire funding period,
sectioning the nominal fee paid by each player into an award period share and a funding period share,
routing at least a portion of the award period share into an award period prize,
routing the funding period share into the fund for the game of skill,
assigning each player to at least one award period team,
comparing the team scores of each award period team, ranking the team scores from lowest to highest and declaring the award period team with the highest score for the award period to be a winning award period team, awarding the award period prize to the winning award period team, and awarding the first fund portion to the winning team with the highest cumulative team score for the entire funding period.

12. A method comprising:
A. hosting a game,
B. making the game accessible to devices communicating over a network,
C. accepting a plurality of players to participate in the game,
D. charging each player a fee to participate in the game,
E. assigning each player to a first team in which the player is an active player assigned at least one other player as a teammate,
F. setting game success measurement standards through which the player earns a game score in an active round,
G. assigning the game score of the player to a passive teammate of at least one additional team where another player will be the active player,
H. aggregating the game score for each active player and passive teammate to form a team score,
I. repeating C through H in order to amass a set of competing teams,
J. accumulating the fee paid by each player to create a fund,
K. ending the game,
L. dividing the fund into three parts, a team fund, a hosting fund, and a beneficiary fund,
M. ranking competing teams according to the team score,
N. awarding the team fund to the winning competing team,
O. retaining the hosting fund, and
P. donating the beneficiary fund to a beneficiary.

13. The method according to claim 12, further comprising:
Q. comparing the game score of each teammate with each other teammate to determine a high score within the team,
R. awarding a proportionate percentage of the team fund to each teammate based upon the game score where higher game scores earn a higher percentage of the team fund.

14. The method according to claim 12, wherein aspects of the method may be carried out simultaneously or in varying order.

15. A system for using an online game of skill to attract and award funders seeking to crowdsource a beneficiary fund comprising:
an interactive game of skill accessible via devices communicating over a network,
a plurality of funders each contributing a nominal fee to participate in the interactive game of skill;
a plurality of funding teams comprised of the funders
a set of challenges posed to each funder,
wherein each funder responds to the challenges and continues to respond to the challenges until a maximum number of failed attempts is accumulated,
wherein the funder earns an individual score as the funder responds to the challenges during an active round of play and the individual score is assigned to at least one passive round of play,
wherein the funder responding correctly to the most challenges earns a highest individual score,
wherein the individual score is assigned to more than one funding team,
wherein a team score is aggregated from each individual score on the funding team,
wherein the funding team vies with other funding teams to earn a highest team score,
the funding team with the highest team score is declared a winning funding team and is awarded a portion of the beneficiary fund,
wherein each individual score is ranked with other individual scores on the winning funding team and is awarded a percentage of the portion of the beneficiary fund according to a best score rank,
a portion of the beneficiary fund is retained by a game administrator creating and scoring responses to the challenges,
a remainder of the beneficiary fund is distributed to a beneficiary.

16. The system of claim 15, wherein the beneficiary is one or more student loan debtors.

17. The system of claim 15, wherein the beneficiary is more than one student loan debtor grouped into a single aggregated queue.

18. The system of claim 15, wherein the beneficiary is a charity.

19. The system of claim 15, wherein the beneficiary is also the game administrator.

20. The system of claim 15, wherein the set of challenges comprise a plurality of trivia questions.

* * * * *

UNITED STATES PATENT AND TRADEMARK OFFICE
CERTIFICATE OF CORRECTION

PATENT NO. : 10,204,361 B2
APPLICATION NO. : 14/785322
DATED : February 12, 2019
INVENTOR(S) : Lizbeth Lenore Pratt It is certified that error appears in the above-identified patent and that said Letters Patent is hereby corrected as shown below:

In the Specification

Column 7, Line 1: replace "successively" with "successfully"

Column 8, Line 31: replace "unforeseeable" with "unforeseen"

Column 9, Line 35: delete "host" before "support"

Column 10, Line 6: add "a" before "loan"

Column 15, Line 3: delete "a" before "the"

Column 18, Line 23: insert --to-- after "order"

Signed and Sealed this
Second Day of April, 2019

Andrei Iancu
*Director of the United States Patent and Trademark Office*